US011498489B2

(12) United States Patent
Myszkowski et al.

(10) Patent No.: US 11,498,489 B2
(45) Date of Patent: **\*Nov. 15, 2022**

(54) STORAGE SYSTEM FOR A VEHICLE AND INTERIOR COMPARTMENT OF A VEHICLE HAVING SAME

(71) Applicant: Honda Motor Co., Ltd., Tokyo (JP)

(72) Inventors: Marek Myszkowski, Powell, OH (US); Sarah J. Huth, Dublin, OH (US); Brian D. Large, Hilliard, OH (US); Shirena Takai, Dublin, OH (US); Prakalp Satvilkar, Marysville, OH (US); Ramesh Gangarangaiah, Dublin, OH (US)

(73) Assignee: HONDA MOTOR CO., LTD., Tokyo (JP)

(\*) Notice: Subject to any disclaimer, the term of this patent is extended or adjusted under 35 U.S.C. 154(b) by 131 days.

This patent is subject to a terminal disclaimer.

(21) Appl. No.: 17/004,962

(22) Filed: Aug. 27, 2020

(65) Prior Publication Data

US 2022/0063503 A1 Mar. 3, 2022

(51) Int. Cl.
*B60R 7/02* (2006.01)

(52) U.S. Cl.
CPC ...................... *B60R 7/02* (2013.01)

(58) Field of Classification Search
CPC ..... B60R 7/02; B60R 7/08; B60R 2011/0036; B60R 11/06; B60R 5/04
See application file for complete search history.

(56) References Cited

U.S. PATENT DOCUMENTS

| | | | | |
|---|---|---|---|---|
| 1,237,750 A * | 8/1917 | Chappell | ................. | B60R 7/043 296/37.15 |
| 1,544,018 A * | 6/1925 | McDonald | ............... | B60R 7/043 296/37.15 |
| 4,750,774 A * | 6/1988 | Pickering | ................ | B60R 11/06 224/543 |
| 5,716,091 A * | 2/1998 | Wieczorek | ................ | B60R 7/02 296/37.16 |
| 6,230,949 B1 * | 5/2001 | O'Connell | ............... | B60R 11/06 224/543 |

(Continued)

FOREIGN PATENT DOCUMENTS

| | | |
|---|---|---|
| CN | 102424022 A | 4/2012 |
| CN | 202413650 U | 9/2012 |

(Continued)

*Primary Examiner* — D Glenn Dayoan
*Assistant Examiner* — Kevin P Weldon
(74) *Attorney, Agent, or Firm* — Kenealy Vaidya LLP

(57) ABSTRACT

A storage system can be located at a front end of a vehicle's rear cargo space. The vehicle can include a rear opening at the rear end of the cargo space and a closure selectively opening and closing the rear opening. The storage system can include a front panel located at the front end of the rear cargo space and a lid. The front panel can include an outer surface facing the rear cargo space and a storage space recessed from the outer surface. The lid can be selectively placed in a closed state and an opened state with respect to the front panel such that the lid conceals the storage space from the rear cargo space when the lid is in the closed state, and the storage space is opened to the rear cargo space when the lid is in opened state.

19 Claims, 7 Drawing Sheets

(56) References Cited

U.S. PATENT DOCUMENTS

| | | | |
|---|---|---|---|
| 6,793,265 B2 | 9/2004 | Kamida et al. | |
| 7,303,221 B2 | 12/2007 | Takahashi et al. | |
| 7,526,098 B2 | 4/2009 | Rosental et al. | |
| 8,308,226 B2 * | 11/2012 | Parkinson | B60R 11/06 296/37.2 |
| 8,696,045 B2 | 4/2014 | Takenaka et al. | |
| 8,727,416 B2 | 5/2014 | Nakazawa | |
| 10,167,032 B2 | 1/2019 | Wolfmueller et al. | |
| 2013/0062236 A1 | 3/2013 | Nakazawa | |
| 2015/0251712 A1 * | 9/2015 | Craven | B60R 5/04 296/37.2 |
| 2016/0280151 A1 * | 9/2016 | Engerman | B25H 5/00 |
| 2018/0127031 A1 * | 5/2018 | Ono | B60R 13/013 |

FOREIGN PATENT DOCUMENTS

| | | | | |
|---|---|---|---|---|
| CN | 203358478 U | 12/2013 | | |
| CN | 203401934 U | 1/2014 | | |
| CN | 208978762 U | 6/2019 | | |
| DE | 3339415 A1 | 5/1985 | | |
| DE | 4139539 C1 | 1/1993 | | |
| JP | 2000085485 A | 3/2000 | | |
| JP | 4239777 B2 | 3/2009 | | |
| JP | 5445117 B2 | 3/2014 | | |
| JP | 2016088318 A | 5/2016 | | |
| JP | 6230398 B2 | 11/2017 | | |
| JP | 2018158637 A | 10/2018 | | |
| KR | 19980029851 U | 8/1998 | | |
| KR | 19980031346 U | 8/1998 | | |
| KR | 200351369 Y1 * | 5/2004 | | B60R 5/04 |
| KR | 100466315 B1 | 1/2005 | | |
| KR | 20170107652 A | 9/2017 | | |
| WO | 2015037152 A1 | 3/2015 | | |

* cited by examiner

STORAGE SYSTEM FOR A VEHICLE AND INTERIOR COMPARTMENT OF A VEHICLE HAVING SAME

BACKGROUND

The disclosed subject matter relates to a storage system for a vehicle. More particularly, the disclosed subject matter relates to methods and apparatus that can store at least one tool for servicing the vehicle.

Vehicles can include a passenger compartment and one or more storage spaces. The storage space can be external to the passenger space or continuous with the passenger space. Some storage spaces can be concealed compartments within or adjacent to the passenger space that can be accessed within the passenger space.

Straps or other fastening structures can be used to secure items in the storage space. The storage space can include a foam insert that can function as a cushion that reduces noise created by an item rattle around in the storage space.

SUMMARY

Some embodiments are directed to a storage system for a rear cargo space of a vehicle. The rear cargo space can have a front end and a rear end, and the vehicle can include a rear opening at the rear end and a closure selectively opening and closing the rear opening. The storage system can include a front panel located at the front end of the rear cargo space and a lid. The front panel can include an outer surface facing the rear cargo space and a storage space recessed from the outer surface. The lid can be connected to the front panel such that the lid is selectively placed in a closed state and an opened state with respect to the front panel such that the lid conceals the storage space from the rear cargo space when the lid is in the closed state, and the storage space is opened to the rear cargo space when the lid is in the opened state.

Some embodiments are directed to an interior storage compartment for a vehicle that can include a floor, a pair of side walls, a rear wall, a rear cargo space, and a storage system. The pair of side walls can extend away from the floor in a vertical direction of the vehicle and extend along a longitudinal direction of the vehicle. The side walls can be spaced apart from each other in a transverse direction of the vehicle. The rear wall can be connected to and extend from the side walls and along the floor in the transverse direction of the vehicle. The rear cargo space can be bounded by the rear wall, the floor and the side walls. The rear cargo space can have a rear end that is bounded by the rear wall and a front end that is spaced away from the rear wall in a longitudinal direction of the vehicle. The storage system can extend along the floor and be located at the front end of the rear cargo space. The storage system can include an outer surface, a storage space and a lid. The outer surface can include the rear cargo space and be spaced away from the rear wall in the longitudinal direction of the vehicle. The storage space can be recessed from the outer surface. The lid can be selectively movable between a closed state and an opened state with respect to the storage space such that the lid conceals the storage space from the rear cargo space when the lid is in the closed state and the storage space is opened to the rear cargo space when the lid is in the opened state.

Some embodiments are directed to an interior compartment of a vehicle including a rear opening and a movable closure selectively opening and closing the rear opening. The interior compartment can include a floor, a pair of side walls, a rear wall, a passenger seat, a rear cargo space, and a storage system. The pair of side walls can extend away from the floor in a vertical direction of the vehicle and can extend along a longitudinal direction of the vehicle. The side walls can be spaced apart from each other in a transverse direction of the vehicle. The rear wall can be connected to and extending from the side walls and extend along the floor and the rear opening in the transverse direction of the vehicle. The passenger seat can be mounted on the floor and spaced away from the rear wall and the rear opening in the longitudinal direction of the vehicle. The rear cargo space can be formed between the floor, the movable closure, the passenger seat, the rear wall, and the side walls. The rear cargo space can be in communication with the rear opening, and can include a front end and rear end. The front end of the rear cargo space can be adjacent to the passenger seat and spaced away from the rear wall and the movable closure in the longitudinal direction of the vehicle. The rear end of the cargo space can be adjacent to the rear wall and the movable closure. The storage system can extend along the floor and be located at the front end of the rear cargo space. The storage system can include an outer surface, a storage space and a lid. The outer surface can face the rear cargo space and be spaced away from the rear wall in the longitudinal direction of the vehicle. The storage space can be recessed from the outer surface in a forward longitudinal direction of the vehicle. The lid can be selectively movable between a closed state and an opened state with respect to the storage space such that the lid conceals the storage space from the rear cargo space when the lid is in the closed state, and the storage space is opened to the rear cargo space when the lid is in opened state. The interior compartment can include at least one of a jack assembly, a bar jack, a wheel wrench, and a funnel accommodated in the storage space. The floor can extend from the outer surface of the storage system to the rear wall in a rearward longitudinal direction of the vehicle that is opposite to the forward longitudinal direction of the vehicle.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 4 is a plan view of an empty storage space of the storage system of FIG. 3 with the lid removed.

FIG. 5 is a plan view showing a jack assembly secured in the storage space of the storage system of FIG. 3 with the lid removed.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
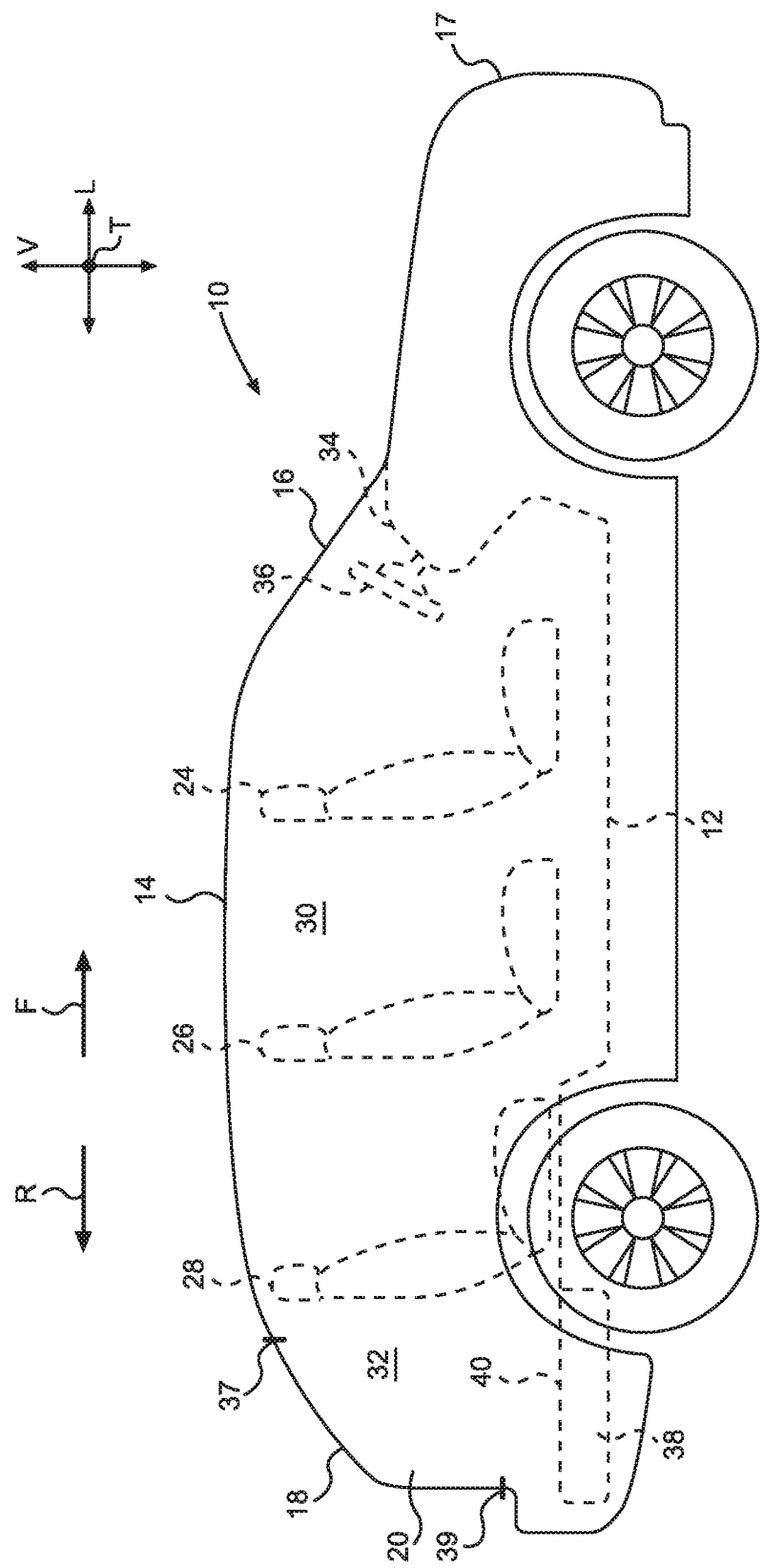
FIG. 1 is a schematically illustrated right side view of a vehicle made in accordance with principles of the disclosed subject matter.
Figure 2:
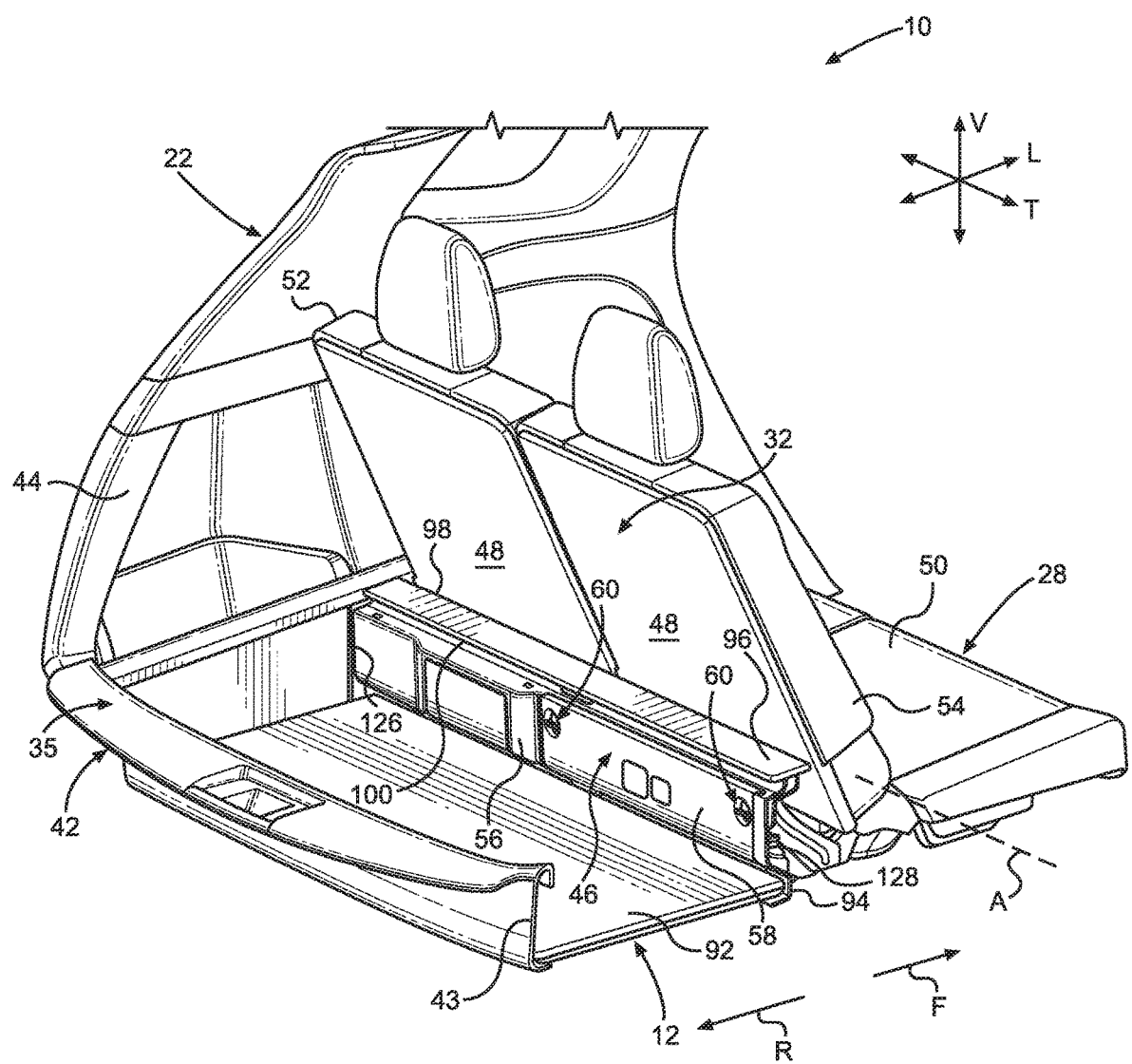
FIG. 2 is a perspective cut-away view of a rear portion of the vehicle of FIG. 1 and including a storage system made in accordance with the principles of the disclosed subject matter.

FIG. 1 schematically illustrates an embodiment of a vehicle made in accordance with principles of the disclosed subject matter. FIG. 2 illustrates a rear portion of the vehicle of FIG. 1. Referring to FIGS. 1 and 2, collectively, the vehicle 10 can include a floor 12, a roof 14, a windshield 16, a front end 17, a rear closure 18, a right side 20, a left side 22. The vehicle 10 extends in a longitudinal direction L between the front end 17 and the rear closure 18. The vehicle 10 extends in a transverse direction T between the right side 20 and the left side 22. The vehicle 10 extends in the vertical direction V between the floor 12 and the roof 14. A viewing direction along the longitudinal direction L that is directed away from the rear closure 18 and toward the front end 17 can be referred to as a forward longitudinal direction F. A viewing direction along the longitudinal direction L that is directed toward the rear closure 18 and away from the front end 17 can be referred to as a rearward longitudinal direction R. Accordingly, a portion of a structure of the vehicle 10 that faces or is directed in the forward longitudinal direction F can be referred to as a front portion, front end or front side. A portion of a structure of the vehicle 10 that faces or is directed in the rearward longitudinal direction R can be referred to as a rear portion, rear end or rear side.

The vehicle 10 can include a plurality of seating rows 24, 26, 28, a passenger space 30, a rear cargo space 32, an instrument panel 34 and a steering wheel 36.

The passenger space 30 can be a volume that is bounded by the floor 12, the roof 14, the sides 20, 22, the instrument panel 34, and the third seating row 28. The rear cargo space 32 can be a volume that is bounded by the floor 12, the roof 14, the sides 20, 22, the rear closure 18 and the third seating row 28. Each of the seating rows 24, 26, 28 can include at least one seat. For example, the first seating row 24 can include a pair of seats that are spaced apart from each other in the transverse direction T of the vehicle and the second and third seating rows 26, 28 can include a single seat that can accommodate at least two passengers. Each of the seating rows 24, 26, and 28 can be permanently mounted to the floor 12.

The rear closure 18 can be selectively opened and closed to permit access to the rear cargo space 32 via a rear opening 35 in the vehicle 10. The rear closure 18 can be delimited by a top end 37 and a bottom end 39 schematically illustrated in FIG. 1. The rear closure 18 can be referred to as a tailgate or a liftgate or a hatch. The rear closure 18 is omitted from FIG. 2 to more clearly illustrate the rear cargo space 32.

The rear cargo space 32 can include a front end that is adjacent to the rear-most seating row and a rear end that is bounded by the rear closure 18. FIGS. 1 and 2 show the third seating row 28 as the rear-most seating row. In alternate embodiments, the third seating row 28 can be omitted and the front end of the rear cargo space 32 can be adjacent to the second seating row 26 which serves as the rear-most seating row.

Referring to FIG. 1, the rear cargo space 32 can include a closed compartment 38. The closed compartment 38 can include a movable or removable cover 40 that selectively opens and closes access to the closed compartment 38. The cover 40 can be flush or substantially flush with the floor 12. Alternate embodiments can omit the closed compartment 38, such as illustrated in FIG. 2.

Referring to FIG. 2, the vehicle 10 can include a rear sill trim panel assembly 42 and a left side trim panel assembly 44. Each of the rear sill trim panel assembly 42 and the left side trim panel assembly 44 can include at least one panel and at least one fastener that can attach the respective panel to a structural member of the vehicle 10 such as but not limited to a metal panel of the floor 12 and a metal panel of left side 22.

The vehicle 10 can include a right side trim panel assembly that extends along the right side 20 and along the rear cargo space 32 that is the same as or similar in shape and structure to the left side trim panel assembly 44. For example, the right side trim panel assembly can be a mirror image of the left side trim panel assembly. The right side trim panel assembly is part of the vehicle 10 that has been cut away to create the view illustrated by FIG. 2.

The rear opening 35 can be bounded by the rear sill trim panel assembly 42, the left side trim panel assembly 44, the right side trim panel assembly and a roof trim panel assembly attached to the inside surface of the roof 14. The rear opening 35 can be in communication with the rear cargo space 32 such that, when the rear closure 18 is in the opened position, objects can be placed into rear cargo space 32 from outside of the vehicle 10 and objects can be removed from inside the rear cargo space 32 and placed outside of the vehicle 10 by passing through the rear opening 35.

The vehicle 10 can include one or more tools that can be used to service the vehicle 10. Exemplary tools can include but are not limited to a fuel funnel, a pressurized sealant bottle (also referred to as a bottle), an air pump, a jack assembly, a wheel wrench (also referred to as a lug wrench) and a bar jack. The rear cargo space 32 can provide a convenient location for storing the tool(s). It can be advantageous to store the tool(s) in a concealed compartment within or adjacent to the rear cargo space 32. Concealing the tool(s) can provide a secured space for restraining the tool(s) and prevent the tool(s) from coming into contact with other items stored in the rear cargo space 32.

The vehicle 10 can include a storage system 46 that is configured to accommodate at least one tool in a concealed compartment. Further, the storage system 46 can be also function as a decorative trim assembly that can conceal other structures of the vehicle 10 such as but not limited to a rear side 48 of the third seating row 28 or a space underneath the third seating row 28.

The storage system 46 can be located at the front end of the rear cargo space 32 with respect to the longitudinal direction L of the vehicle. The storage system 46 can be configured to store and conceal at least one of the fuel funnel, pressurized sealant bottle, air pump, jack assembly, wheel wrench and bar jack. The storage system 46 can extend along the transverse direction T of the vehicle 10 from the left side panel assembly 44 to the right side panel assembly. The storage system 46 can extend along the floor 12 of the vehicle 10. The storage system 46 can be adjacent to or abut the rear side 48 of the third seating row 28. The storage system 46 can be located in the closed compartment 38 if the vehicle 10 includes the closed compartment 38. Alternate embodiments can include the storage system 46 located outside of the closed compartment 38 if the vehicle 10 includes the closed compartment 38.

The third seating row 28 can include a seat bottom 50, a left seat back 52 and a right seat back 54. The seat backs 52, 54 can pivot relative to the seat bottom 50 about pivot axis A. The pivot axis A can extend in the transverse direction T of the vehicle 10. The left seat back 52 can pivot independently of the right seat 54.

The storage system 46 can extend along the front end of the rear cargo space 32 such that the seat backs 52, 54 are located between the storage system 46 and the seat bottom 50. The storage system 46 can extend along the pivot axis A. The storage system 46 can cover the pivot axis A when viewed in the forward direction F from the rear cargo space 32. The storage system 46 can extend parallel to or substantially parallel to the pivot axis A such that one of ordinary skill would perceive the storage system 46 to be parallel to the pivot axis A.

Figure 3:
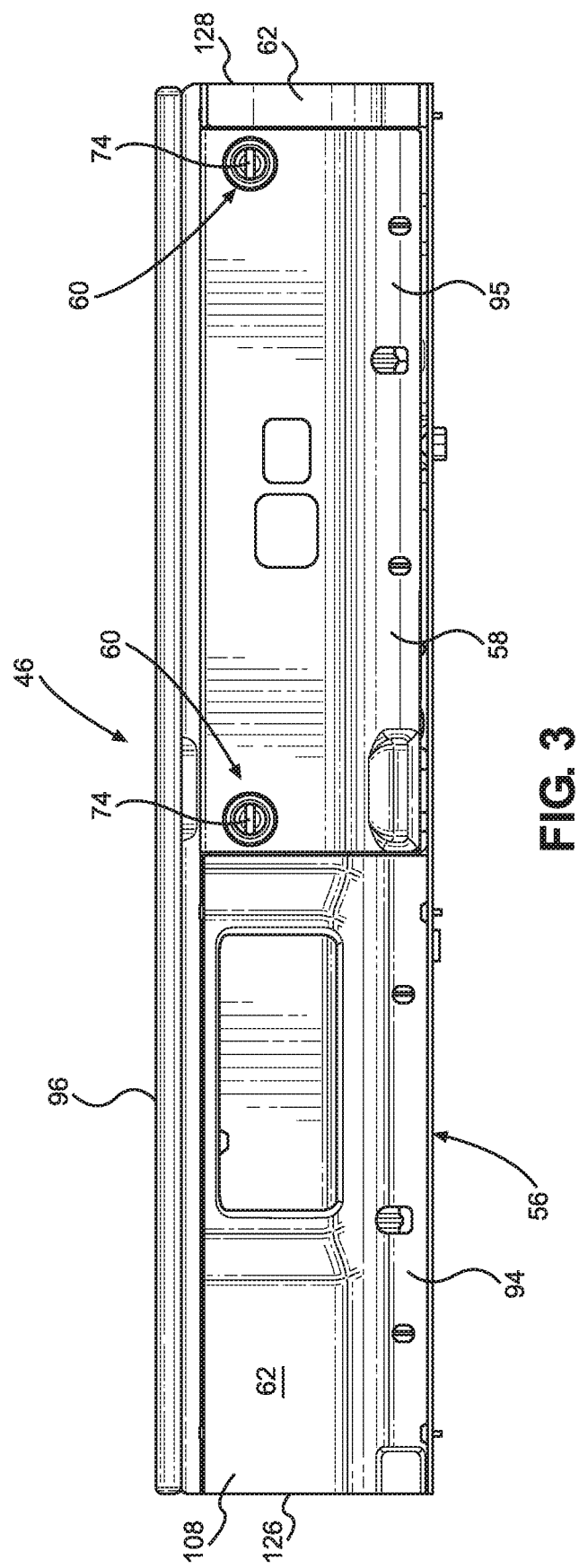
FIG. 3 is a plan view of the storage system of in FIG. 2.

Referring to FIGS. 2 and 3, the storage system 46 can include a front panel 56, a lid 58 and a pair of lock mechanisms 60.

The front panel 56 can extend in the transverse direction T of the vehicle 10 from the left side trim panel assembly 44 to the right side trim panel. The front panel 56 can include a left end 126 that is adjacent to or abuts the left side trim panel assembly 42 and a right end 128 that is adjacent to or abuts the right side trim panel assembly. The front panel 56 can face the rear opening 35 in the longitudinal direction L of the vehicle 10. The front panel 56 can extend long the floor 12 in the transverse direction T of the vehicle 10.

Referring to FIG. 2, the rear sill trim assembly 42 can include a rear wall 43 that extends in the transverse direction T and vertical direction V of the vehicle 10. The rear wall 43 can extend along the floor 12. The rear wall 43 can be straight or slightly curved in the transverse direction T of the vehicle 10. The front panel 56 can be parallel to or substantially parallel to the rear wall 43 such that one skilled in the art would perceive the front panel 56 and the rear wall as being parallel to each other.

Referring to FIGS. 2-5 collectively, the front panel 56 can include an outer surface 62 and a storage space 64 that is recessed from the outer surface 62 in the forward direction F. The outer surface 62 can face in the rearward longitudinal direction R of the vehicle 10. The outer surface 62 can face rear wall 43 of the rear sill trim panel assembly 42. The storage space 64 can be configured to accommodate at least one of the fuel funnel, the pressurized sealant bottle, the air pump, the jack assembly, the wheel wrench and the bar jack.

Figures 4, 5:
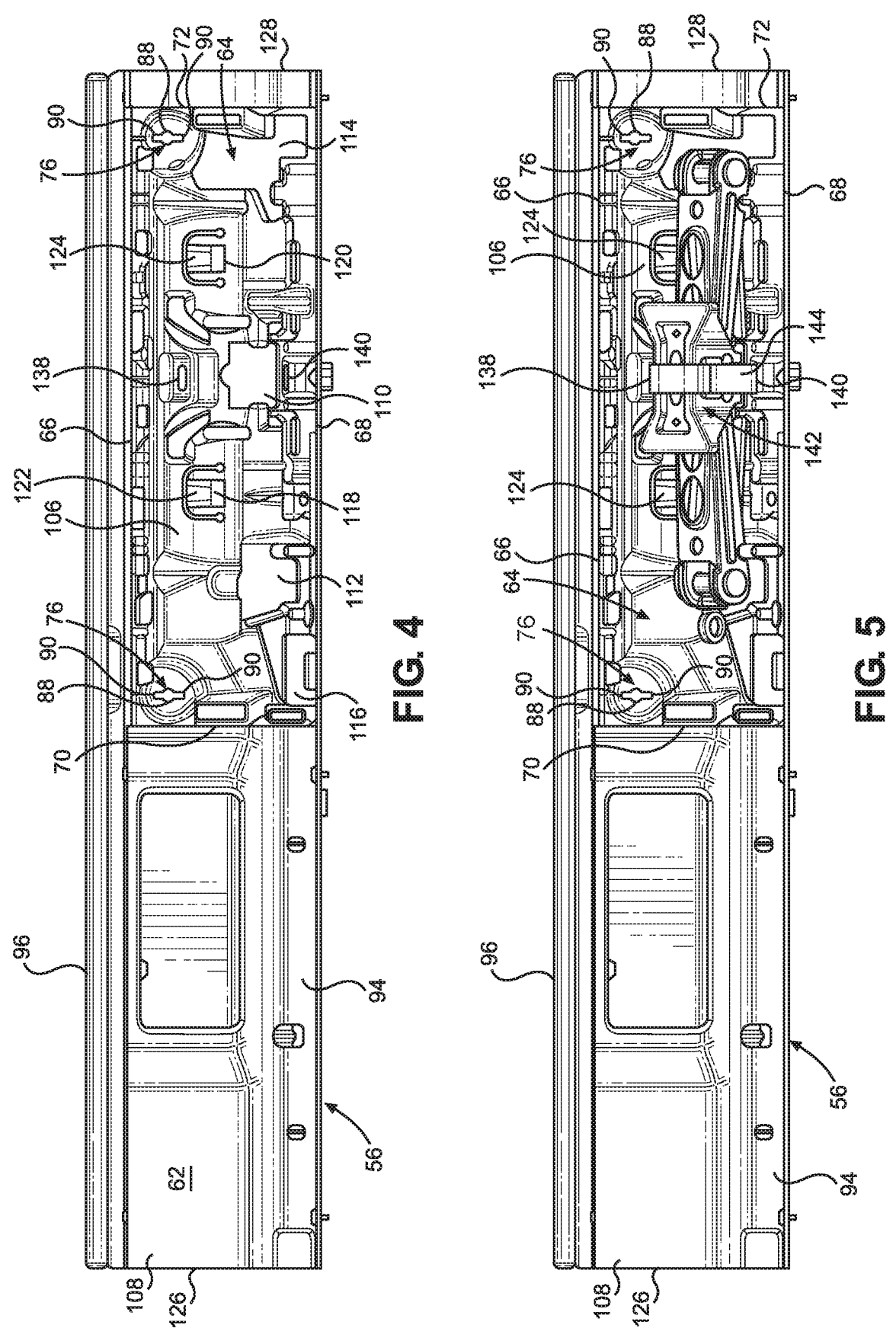

Referring to FIGS. 4 and 5, the front panel 56 can include an upper edge 66, a lower edge 68, a left edge 70 and a right edge 72. The upper and lower edges 66, 68 can form the upper and lower limits, respectively, of the storage space 64 in the vertical direction V of the vehicle 10. The left and right edges 70, 72 can form the left and right limits, respectively, of the storage space 64 in the transverse direction T of the vehicle 10. The front panel 56 can include an opening bounded by the edges 66, 68, 70, 72.

The lid 58 can be selectively connected to and removed from the front panel 56 such that the lid 58 can selectively expose and cover the storage space 64 when the lid 58 is connected to the front panel 56. For example, the lid 58 can be configured to selective open and close the opening in the front panel 56 that is bounded by the edges 66, 68, 70, 72. The lock mechanism 60 can selectively lock and unlock the lid 58 to and from the front panel 56. Referring to FIGS. 3 and 8, the lock mechanism 60 can include a lock 74. Referring to FIGS. 4 and 5, the lock mechanism 60 can include a first keyhole 76 formed in the front panel 56. Referring FIGS. 6 and 7 the lock mechanism 60 can include a second keyhole 78 formed in the lid 58.

Referring to FIG. 8, the lock 74 can include a flange 80, a grip 82, a stem 84 and a pair of locking arms 86. The locking arms 86 can be connected to and extend from the stem 84 and can be oriented to align with the grip 82.

Referring to FIGS. 4-7, each of the keyholes 76, 78 an include a circular opening 88 and a pair of elongated openings 90 in communication with the circular opening 88 such that the circular opening 88 and the elongated openings for a continuous opening. The lock 74 can pass through each of the keyholes 76, 78 when the locking arms 86 arm aligned with the elongated openings 90. The lock 74 can be retained in the keyholes 76, 78 when the locking arms are rotated out of alignment with the elongated openings 90. The elongated openings 90 of the second keyhole 78 can be misaligned with the elongated openings 90 of the first keyhole 76 so that the lock 74 remains connected to the lid 58 when the lock 74 is rotated to the unlocked position with respect to the first keyhole 76.

Referring to FIG. 2, the floor 12 can include a floor panel 92. The floor panel 92 can extend in the transverse direction T of the vehicle 10 and between the left side trim panel assembly 44 and the right side trim panel assembly. The floor panel 92 can extend in the longitudinal direction L of the vehicle 10 and between rear sill trim panel assembly 42 and the front panel 56. The floor panel 92 can be formed from any appropriate material such as but not limited to plastic, metal, carbon fiber, fiber reinforced plastic, fiber glass, wood fiber board, or wood particle board. The floor panel 92 can include a carpet or matting layer on top of a panel formed from any of the materials described above. The floor panel 92 can be permanently fixed in the rear cargo space 32. Alternate embodiments can include a floor panel 92 that is configured as the movable cover 40 described above.

The front panel 56 can include a channel 94 along the lower end of the front panel 56. The floor panel 92 can extend into the channel 94 of the front panel 56. The front panel 56 can be positioned between the floor panel 92 and the third seating row 28 in the longitudinal direction L of the vehicle 10. Referring to FIGS. 3 and 5, the lid 58 can include an extension 95 that forms a continuation of the channel 94 along the lid 58.

Referring to FIGS. 2-5, the storage system 46 can include an upper panel 96 connected to the front panel 56 in any appropriate manner such as but not limited to mechanical fasteners, adhesives, or an interference fit between mating portion(s) of the front panel 56 can the upper panel 96. The upper panel 96 can extend along the top end of the front panel 56 in the transverse direction T of the vehicle 10. The upper panel 96 can extend away from the front panel 56 in the forward longitudinal direction F of the vehicle 10. The upper panel 96 can extend from the front panel 56 to the rear side 48 of the seat backs 52, 54 in the longitudinal direction L of vehicle 10. The upper panel 96 can include a front end 98 that abuts the rear side 48 of the seat backs 52, 54 and a rear end 100 that extends along the front panel 56.

Referring to FIGS. 4 and 5, the front panel 56 can include a storage wall 106 and a main wall 108. The main wall 108 can include the outer surface 62 and the opening in the front panel 56 can be formed in the main wall 108. The storage wall 106 can be recessed from the outer surface 62 of the front panel 56. The storage wall 106 can be connected to and extend from each of the edges 66, 68, 70, 72 such that the storage wall 106 and the edges 66, 68, 70, 72 bound the storage space 64 of the front panel 56. The storage space 64 can extend from the opening in the front panel 56 to the storage wall 106 in the forward longitudinal direction F and along the storage wall 106 in the transverse direction T of the vehicle 10. The first keyholes 76 can be formed in the storage wall 106 adjacent to the corners where the edges 70, 72 intersect with the upper edge 66.

Figure 6:
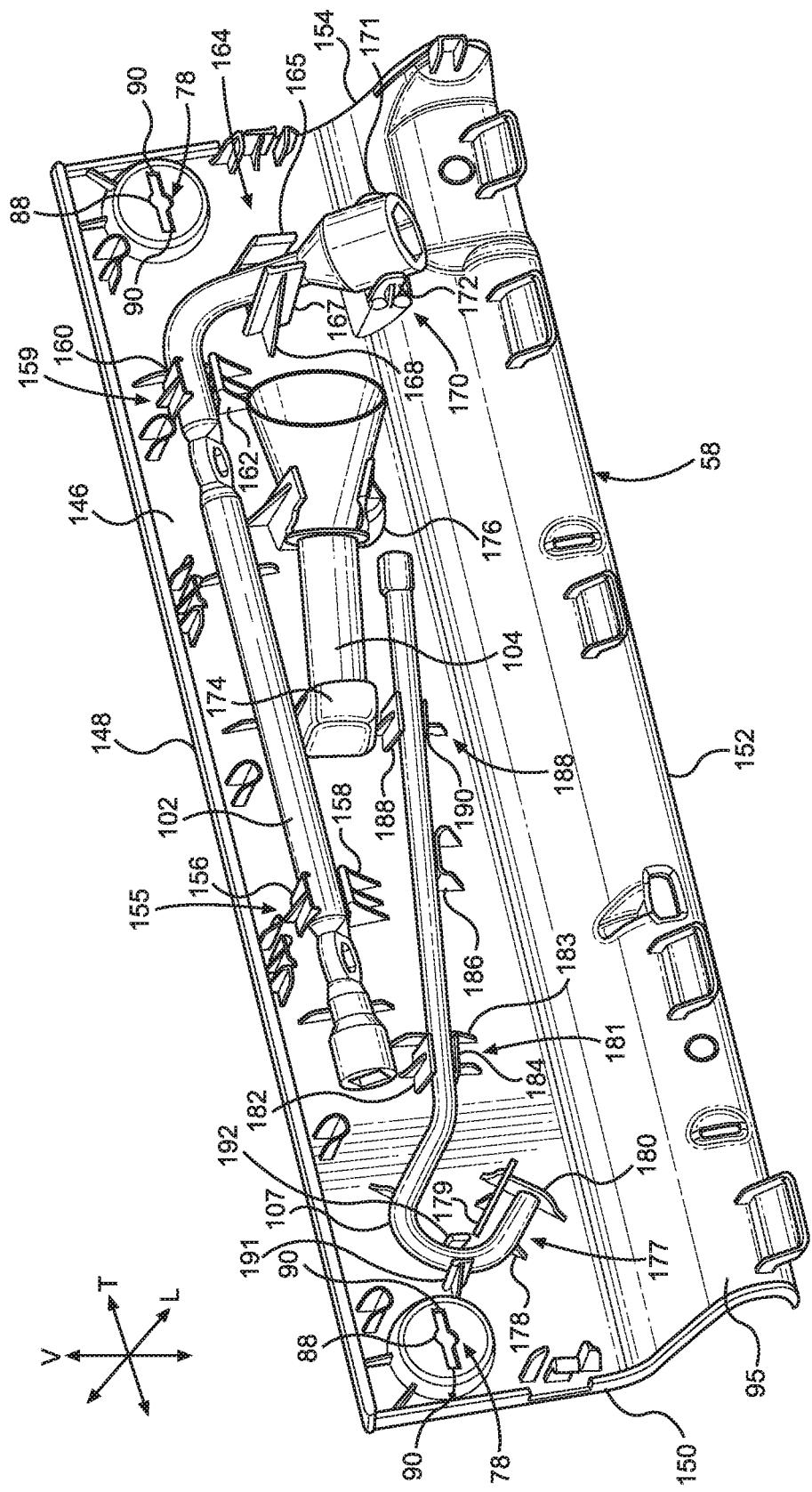
FIG. 6 is perspective view of a rear side of the lid of the storage system of FIG. 3 with exemplary tools attached to the lid.

The storage wall 106 can be configured to accommodate at least one of the fuel funnel, the pressurized air sealant bottle, the air pump, the jack assembly, the wheel wrench and the bar jack. Referring to FIGS. 5 and 6, the storage wall 106 can be configured to accommodate a wheel wrench 102, a funnel 104, a bar jack 107 and a jack assembly 142 in the storage space 64. The storage wall 106 can have an irregular surface contour that is complimentary to the wheel wrench 102, the funnel 104, the bar jack 107 and the jack assembly 142.

The jack assembly 142 can be in a folded/retracted position when accommodated in the storage space 64. The storage wall 106 can be configured to engage the jack assembly 142 such that the jack assembly 142 is accommodated in the storage space 64 in a predetermined orientation. Referring to FIGS. 4 and 5, the storage wall 106 can include a pair of supports 122, 124, an upper strap opening 138 and a lower strap opening 140. The supports 122, 124 can project away from the surface of the storage wall 106 and toward the jack assembly 142 such that the supports 122, 124 cause the jack assembly 142 to tilt with respect to the vertical direction V toward the floor 12 of the vehicle 10. The strap openings 138, 140 can have any appropriate shape that can accommodate a strap 144 passing through the openings 138, 140.

Referring to FIG. 4, the storage wall 106 can include a plurality of apertures 110, 112, 114, 116, 118, 120 space apart along the wall 106. The first aperture 110 can be located between the upper strap opening 138 and the lower opening 140. The second aperture 112 can be located between the first aperture 110 and left edge 70 in the transverse direction T. The third aperture 114 can be located between the first aperture 110 and the right edge 72 in the transverse direction T. The fourth aperture 116 can be located between the second aperture 112 and the left edge 70 in the transverse direction T and can oppose the extension 95 of the lid in the longitudinal direction L The fifth aperture 118 can be located adjacent to and below the first support 122. The sixth aperture 120 can be located adjacent to and below the second support 124.

The strap 144 can run through both of the upper and lower strap openings 138, 140. The strap 144 can be placed over the jack assembly 142 and tightened in order to secure the jack assembly 142 to the storage space 64. The strap 144 can be any appropriate fastening structure such as but not limited to a strap with a hook and loop fastener, or a belt and buckle, or a cinch strap.

Figure 7:
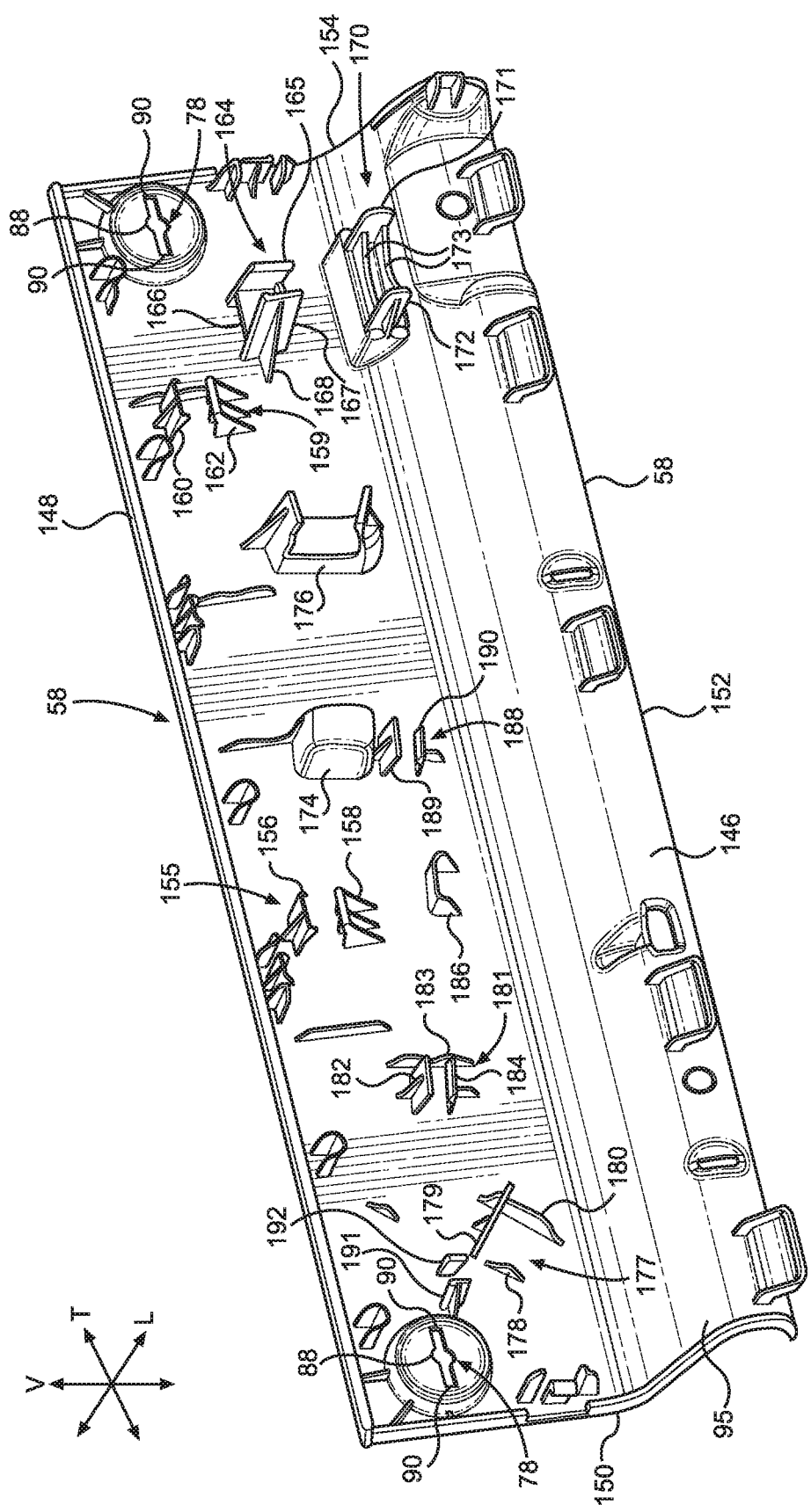
FIG. 7 is perspective view of the rear side of the lid of FIG. 6 with the exemplary tools removed from the lid.
Figure 8:
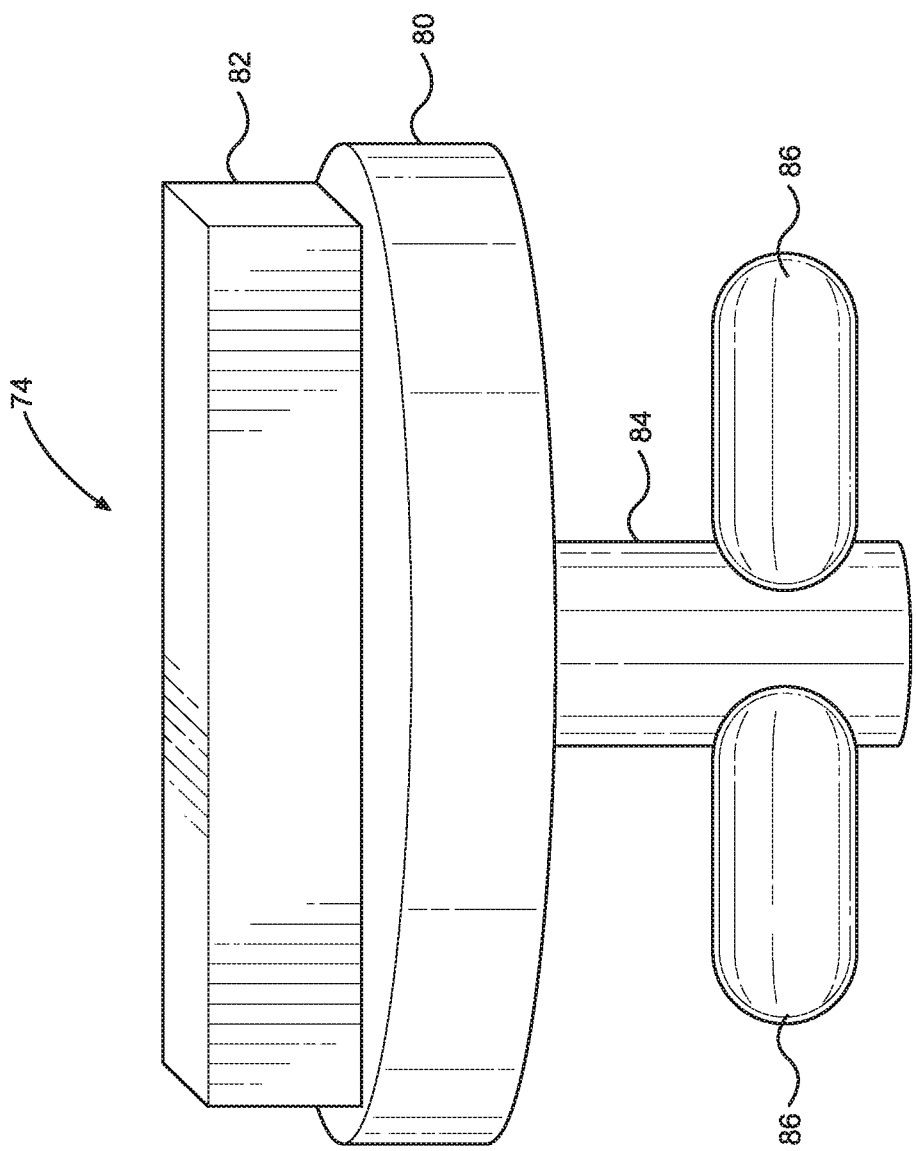
FIG. 8 is perspective view of a key for a lock mechanism of the storage system of FIG. 2.

Referring to FIGS. 6 and 7, the lid 58 can have an inner surface 146 that faces the storage space 64, when the lid 58 is in a closed state. The lid 58 can have a first edge 148, a second edge 150, a third edge 152, and a fourth edge 154. The first edge 148 can be straight. The second and fourth edges 150, 154 can have a curved shape. The third edge 152 can be substantially straight. The second keyholes 78 can be adjacent to the first edge 148. One of the second keyholes 78 can be adjacent to the first edge 148 and the second edge 150 and a different one of the keyholes 78 can be adjacent to the first edge 148 and the fourth edge 154.

The lid 58 can include a first clip member 155, a second clip member 159, a third clip member 164, and a fourth clip member 170 extending from and integrally formed with the inner surface 146. The clip members 155, 159, 164, 170 can removably secure the wheel wrench 102 to the inner surface 146 of the lid 58. The first and second clip members 155, 159 can be adjacent to the first edge 148 of the lid 58. The first and second clip members 155, 159 can be spaced apart from each other along the transverse direction T. The third and fourth clip members 164, 170 can be: spaced apart along the vertical direction V; located between the second clip member 159 and the fourth edge 154 of the lid 58 in the transverse direction T of the vehicle 10; and located between the second clip member 159 and the third edge 152 of the lid 58 in the vertical direction V of the vehicle 10. The fourth clip member 170 can be located between the third clip member 164 and the third edge 152 in the vertical direction V of the vehicle 10.

The first clip member 155 can have a top arm 156 and a bottom arm 158 spaced apart from each other along the vertical direction V of the vehicle 10 by a distance that is less than a corresponding dimension of the wheel wrench 102. One or both of the arms 156, 158 can be configured to resiliently deflect as the wheel wrench 102 is placed between and removed from the arms 156, 158.

The second clip member 159 can have a top arm 160 and a bottom arm 162 spaced apart from each other along the vertical direction V. The top arm 160 and the bottom arm 162 can be spaced apart from each other in the vertical direction V of the vehicle 10 by a distance that is less than a corresponding dimension of the wheel wrench 102. One or both of the arms 160, 162 can be configured to resiliently deflect as the wheel wrench 102 is placed between and removed from the arms 160, 162.

The third clip member 164 can have a first side arm 165 and a second side arm 167 connected to each other by a bridge 166. The first and second side arms 165, 167 can be spaced apart along the transverse direction T. The second side arm 167 can be inclined. The second side arm 167 can have a triangular flange 168 extending along the transverse direction T. The side arms 165, 167 can be spaced apart from each other in the transverse direction T of the vehicle 10 by a distance that is less than a corresponding dimension of the wheel wrench 102. One or both of the side arms 165, 167 can be configured to resiliently deflect as the wheel wrench 102 is placed between and removed from the arms 165, 167.

The fourth clip member 170 can have a pair of arms 171, 172 and a pair of supports 173 that extend from and connected to each of the arms 171, 172. The arms 171, 172 can be spaced apart from each other in the transverse direction T of the vehicle 10 by a distance that is less than a corresponding dimension of the wheel wrench 102. One or both of the arms 171, 172 can be configured to resiliently deflect as the wheel wrench 102 is placed between and removed from the arms 171, 172.

The lid 58 can include a cap member 174 and a holding member 176 extending from and integrally formed with the inner surface 146. The cap member 174 and the holding member 176 can removably secure the funnel 104 to the inner surface 146. The cap member 174 can be located between the first and second clip members 155, 159 in the transverse direction T of the vehicle 10. The cap member 174 can have an opening and an inner passageway. The opening of the cap member 174 can face the holding member 176. The holding member 176 can have a concave shape. The holding member 176 can be located between the cap member 174 and the third clip member 164 in the transverse direction T of the vehicle 10. The cap member 174 and the holding member 176 can be spaced apart along the transverse direction T.

The lid 58 can include a retaining member 177, a gripping member 181, a shelf member 186, and a clamp member 188 extending from and integrally formed with the inner surface 146. The members 177, 181, 186, 188 can be configured to removably secure the bar jack 107 to the inner surface 146.

The retaining member 177 can include a tab 178, a side wall 179, a bottom wall 180, a first arm 191 and a second arm 192 that are configured to removable secure the bar jack 107 to the inner surface 146 of the lid 59. The tab 178 can be spaced apart from the walls 179, 180. The side wall 179 and the bottom wall 180 can intersect each other at a right angle. The arms 191, 192 can be spaced apart from each other in the transverse direction T of the vehicle 10 by a distance that is less than a corresponding dimension of the bar jack 107. One or both of the arms 191, 192 can be configured to resiliently deflect as the bar jack 107 is placed between and removed from the arms 191, 192.

The gripping member 181 can have a top wall 182, a side wall 183, and a bottom wall 184. The top and bottom walls 182, 184 can be spaced apart along the vertical direction V the vehicle 10 by a distance that is less than a corresponding dimension of the bar jack 107. One or both of the walls 182, 184 can be configured to resiliently deflect as the bar jack 107 is placed between and removed from the walls 182, 184. The side wall 183 can be attached to both of the top wall 182 and the bottom wall 184.

The shelf member 186 can support a middle portion of the bar jack 107 in the vertical direction V of the vehicle 10.

The clamp member 188 can have a top wall 189 and a bottom wall 190. The walls 189, 190 can be spaced apart along the vertical direction V. The top wall 189 can be adjacent to the cap member 174.

Accordingly, the storage system 46 can be configured to secure the tool(s) without a separate foam insert yet still provide an advantageous level of noise suppression. Thus, the storage system 46 can reduce the part count and assembly time for manufacturing and installing the storage system 46 and can simplify securement and removal of the tool(s) from the storage system 46. Further, the storage system can be advantageously integrated with a decorative trim panel that can conceal or obstruct other structure(s) of the vehicle 10 such as but not limited to a lower portion of a seat, or a space between a seat and the floor 12 of the vehicle 10.

While certain embodiments of the invention are described above, it should be understood that the invention can be embodied and configured in many different ways without departing from the spirit and scope of the invention.

For example, embodiments are disclosed above in the context of three seating rows shown in FIG. 1 However, alternate embodiments of the vehicle can a second seating row and a third seating row that are foldable and/or removable from the vehicle 10 such that an interior cargo space can be expand from the rear cargo space 32 to the second seating row or the first seating row. Further, alternate embodiments of the vehicle 10 can omit the third seating row 28 entirely such that the front end of the rear cargo space 32 is bound by the second seating row 26.

Exemplary embodiments can include a third seating row 28 (or a second seating row 26) that includes a left seat back 52 and a right seat back 54 that are equal in size to each other or that are different in size to each other. Exemplary embodiments can include a third seating row 28 (or a second seating row 26) that includes a single seat back that spans the entire seat bottom 50 along the transverse direction T of the vehicle 10. Alternate embodiments can include a third seating row 28 (or a second seating row 26) that includes a seat back that does not pivot relative to the seat bottom 50. Exemplary embodiments can include a third seating row 28 (or a second seating row 26) that includes a seat bottom 50 that can accommodate more than one passenger. Exemplary embodiments can include a third seating row 28 (or a second seating row 26) that includes a plurality of discrete seat bottoms that each accommodate only one passenger.

Exemplary embodiments can include a storage space 64 that extends under the last seating row 28.

FIG. 1 shows seating rows 24, 26, 28. Each of the seating rows 24, 26, and 28 can be immovably fixed to the floor 12 or movably mounted to the floor 12, such as via rails.

FIGS. 2 and 3 show a two lock mechanisms 60. However, alternate embodiments can include any appropriate number of lock mechanisms, including a single lock mechanism 60. Further, alternate embodiments can replace the lock mechanism with any other appropriate connection structure such as but not limited to threaded fasteners, resiliently deformable snap fasters, straps, hook and loop strips and any combination thereof.

Alternate embodiments can include the first and second keyholes 76, 78 located at any appropriate location on the storage wall 106 and the lid 58.

The lid 58 is described above and illustrated in the drawings as being selectively detached from and attached to the front panel 56. However, exemplary embodiments can include any appropriate structure that can allow the lid 58 to be selectively placed in a closed state and an opened state. For example, the storage system 46 can include at least one hinge that pivotally connects the lid 58 to the front panel 56. In another exemplary embodiment, the storage system 46 can include at least one fastener on the front panel 56 and at least one mating fastener on the lid 58 that snap-fit together. In another exemplary embodiment, the lid 58 can be press-fit into engagement with the front panel 56.

The exemplary embodiment of the storage system 46 described above and shown in the drawing can be integrally formed by mold a plastic material into the structure of the panel 56 and the structure of the lid 58. However, exemplary embodiments can include a panel 56 that formed from two or components that are subsequently connected together in any appropriate manner. Exemplary embodiments can include a lid 58 that is formed from two or more components that are subsequently connected together in any appropriate manner.

FIG. 6 shows an inner surface 146 configured to support each of the wheel wrench 102, the funnel 104, and the bar jack 107. However, alternate embodiments can omit any one of or any combination of the wheel wrench 102, the funnel 104, and the bar jack 107.

Further, exemplary embodiments can include a storage space 64 that can accommodate more than four tools or less than four tools. Exemplary embodiments can include any shape, profile or other geometry for the storage wall 106 such that the storage space 64 can accommodate the item(s) to be stowed in the storage space 64 and the lid 58 can conceal the tool(s) contained in the storage system 46.

What is claimed is:

1. A storage system for a rear cargo space of a vehicle, the rear cargo space having a front end and a rear end, and the vehicle including a rear opening at the rear end and a closure selectively opening and closing the rear opening, the storage system comprising:
    a front panel located at the front end of the rear cargo space and including an outer surface facing the rear cargo space and a storage space recessed from the outer surface; and a lid connected to the front panel such that the lid is selectively placed in a closed state and an opened state with respect to the front panel such that the lid conceals the storage space from the rear cargo space when the lid is in the closed state, and the storage space is opened to the rear cargo space when the lid is in the opened state, wherein the front panel includes a channel configured to receive a floor panel forming a portion of the rear cargo space, and the channel is opened toward the rear end of the rear cargo space.

2. The storage system according to claim 1, wherein the front panel includes,
   a main wall including a storage opening in the main wall and an outer surface facing the rear end of the rear cargo space in a longitudinal direction of the vehicle, and
   a storage wall connected to the main wall, recessed from the outer surface, and opposed to the storage opening,
   the storage space extends from the storage opening to the storage wall in the longitudinal direction of the vehicle and across the storage wall in a transverse direction of the vehicle, and
   the lid closes the storage opening when the lid is in the closed state and opens the storage opening when the lid is in the opened state.

3. The storage system according to claim 2, wherein the storage wall includes a plurality of supports configured to engage a tool when the tool is stowed in the storage space, and
   the supports, the storage wall and the main wall are a single, homogenous structure made of a plastic material.

4. The storage system according to claim 3, wherein the storage space is configured to accommodate at least one of a jack assembly, a funnel, a bar jack, and a wheel wrench,
   the storage wall is configured to receive the jack assembly on the supports, and
   the lid includes an inner surface that faces the storage space when the lid is in the closed state, and the lid is configured to secure at least one of the funnel, the bar jack, and the wheel wrench to the inner surface of the lid.

5. The storage system according to claim 4, further comprising:
   a flexible strap, wherein the storage wall includes a pair of openings spaced apart from each other, and the flexible strap passes through the openings and across the jack assembly to secure the jack assembly to the storage wall when the jack assembly is accommodated in the storage space.

6. The storage system according to claim 2, wherein the front panel includes a first end, a second end spaced away from the first end in a transverse direction of the vehicle, a first inner edge spaced away from the first end in the transverse direction, and a second inner edge spaced away from the second end in the transverse direction of the vehicle,
   the storage opening extends from the first inner edge to the second inner edge in the transverse direction of the vehicle, and
   the storage wall extends from and is connected to each of the first inner edge and the second inner edge.

7. The storage system according to claim 1, wherein the front panel extends across the rear cargo space in a transverse direction of the vehicle and faces toward the rear opening in a longitudinal direction of the vehicle.

8. An interior storage compartment for a vehicle, comprising:
   a floor;
   a pair of side walls extending away from the floor in a vertical direction of the vehicle and extending along a longitudinal direction of the vehicle, and the side walls are spaced apart from each other in a transverse direction of the vehicle;
   a rear wall connected to and extending from the side walls and along the floor in the transverse direction of the vehicle;
   a rear cargo space bounded by the rear wall, the floor and the side walls, and the rear cargo space has a rear end that is bounded by the rear wall and a front end that is spaced away from the rear wall in a longitudinal direction of the vehicle; and
   a storage system extending along the floor, located at the front end of the rear cargo space, and including,
      an outer surface facing the rear cargo space and spaced away from the rear wall in the longitudinal direction of the vehicle,
      a storage space recessed from the outer surface, and
      a lid selectively movable between a closed state and an opened state with respect to the storage space such that the lid conceals the storage space from the rear cargo space when the lid is in the closed state and the storage space is opened to the rear cargo space when the lid is in the opened state, wherein
   the front panel includes a channel opened toward the rear end of the rear cargo space, and
   the floor includes a floor panel extending along a bottom portion of the rear cargo space, the floor panel includes,
      a rear edge extending along the rear wall, and
      a front edge spaced away from the rear edge in the longitudinal direction of the vehicle and located in the channel.

9. The interior storage compartment according to claim 8, wherein
   the storage system includes a front panel extending along the floor in a transverse direction of the vehicle, and the front panel includes the outer surface and the storage space, and
   the lid is connected to the front panel when the lid is in the closed state and the lid is detached from the front panel when the lid is in the opened state.

10. The interior storage compartment according to claim 9, wherein the front panel is substantially parallel to the rear wall.

11. The interior storage compartment according to claim 9, wherein the front panel extends from each of the side walls in the transverse direction of the vehicle.

12. The interior storage compartment according to claim 11, wherein
   the front panel includes,
      a first end adjacent to a first one of the side walls,
      a second end adjacent to a second one of the side walls,
      a storage opening through the front panel and spaced away from each of the first and second ends,
      a first edge and a second edge extending along the opening such that the storage opening extends from the first edge to the second edge in the transverse direction of the vehicle, and each of the first edge and the second edge is spaced away from each of the first end and the second end in the transverse direction of the vehicle, and a storage wall extending from and connected to each of the first edge and the second edge, and the storage wall opposing the storage opening in the longitudinal direction of the vehicle, the storage space extends from the storage opening to the storage wall in the longitudinal direction of the vehicle, and the lid closes the storage opening when the lid is in the closed state and the lid opens the storage opening when the lid is in the opened state.

13. The interior storage compartment according to claim 8, wherein the storage space is spaced away from each of the side walls.

14. The interior storage compartment according to claim 8, wherein the storage space is opened toward the rear wall when the lid is in the opened state.

15. The interior storage compartment according to claim 8, wherein the lid includes a concave portion aligned with the channel, and the front edge of the floor panel opposes the concave portion.

16. An interior compartment of a vehicle including a rear opening and a movable closure selectively opening and closing the rear opening, the interior compartment comprising:

a floor;

a pair of side walls extending away from the floor in a vertical direction of the vehicle and extending along a longitudinal direction of the vehicle, and the side walls are spaced apart from each other in a transverse direction of the vehicle;

a rear wall connected to and extending from the side walls, extending along the floor and the rear opening in the transverse direction of the vehicle;

a passenger seat mounted on the floor and spaced away from the rear wall and the rear opening in the longitudinal direction of the vehicle;

a rear cargo space formed between the floor, the movable closure, the passenger seat, the rear wall, and the side walls, the rear cargo space is in communication with the rear opening, and the rear cargo space includes, a front end that is adjacent to the passenger seat and spaced away from the rear wall and the movable closure in the longitudinal direction of the vehicle, and a rear end that is adjacent to the rear wall and the movable closure;

a storage system extending along the floor, located at the front end of the rear cargo space, and including, an outer surface facing the rear cargo space and spaced away from the rear wall in the longitudinal direction of the vehicle, a storage space recessed from the outer surface in a forward longitudinal direction of the vehicle, and a lid selectively movable between a closed state and an opened state with respect to the storage space such that the lid conceals the storage space from the rear cargo space when the lid is in the closed state, and the storage space is opened to the rear cargo space when the lid is in opened state; and at least one of a jack assembly, a bar jack, a wheel wrench, and a funnel stored in the storage space, wherein the floor extends from the outer surface of the storage system to the rear wall in a rearward longitudinal direction of the vehicle that is opposite to the forward longitudinal direction of the vehicle, the front panel includes a channel opened toward the rear end of the rear cargo space, and the floor includes a floor panel extending along a bottom portion of the rear cargo space, the floor panel includes, a rear edge extending along the rear wall, and a front edge spaced away from the rear edge in the longitudinal direction of the vehicle and located in the channel.

17. The interior compartment according to claim 16, wherein the passenger seat includes a seat bottom mounted to the floor and a seat back pivotally connected to the seat bottom such that the seat back pivots about a pivot axis that extends in the transverse direction of the vehicle, and the storage space extends along the pivot axis in the transverse direction of the vehicle.

18. The interior compartment according to claim 17, wherein the seat back includes a rear side that faces the rear opening in the longitudinal direction of the vehicle, the rear side of the seat back bounds the front end of the rear cargo space, and the storage system abuts the rear side of the seat back.

19. The interior compartment according to claim 17, wherein the lid includes an inner surface facing the passenger seat in the longitudinal direction of the vehicle and extending across the storage space in the transverse direction when the lid is in the closed state, and at least one of the bar jack, the wheel wrench, and the funnel is secured to the inner surface of the lid.

* * * * *